Sept. 1, 1964  F. C. BLIGHT  3,147,215
DEMINERALISATION OF WATER
Filed May 16, 1961  2 Sheets-Sheet 1
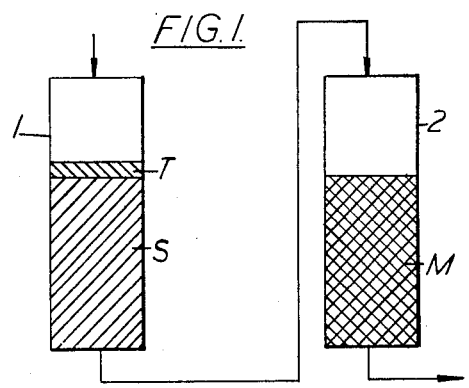
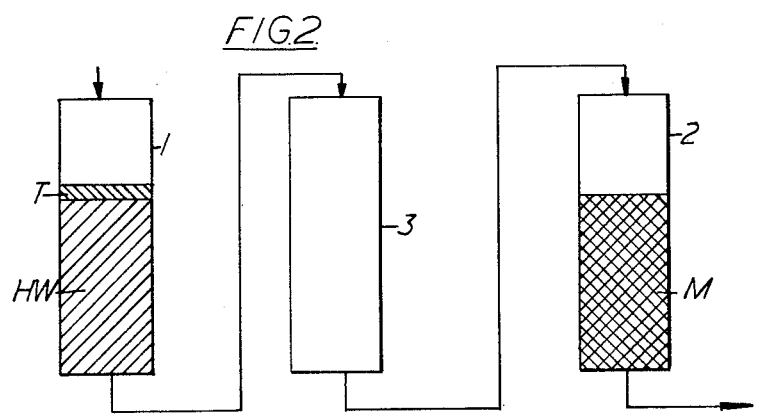
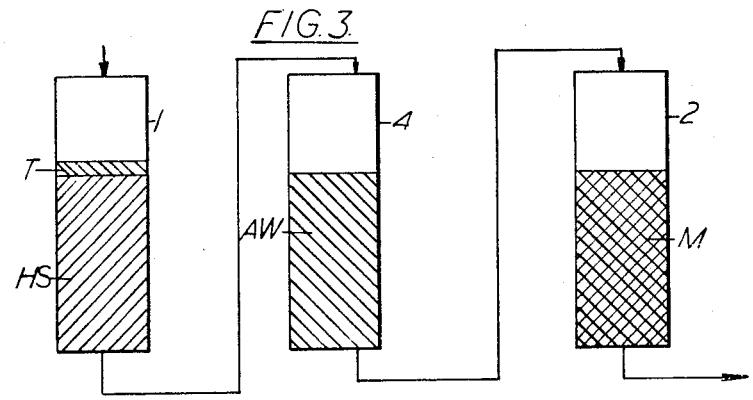
Inventor
FRANK CHARLES BLIGHT
By
Bailey, Stephens & Huette
Attorneys Sept. 1, 1964  F. C. BLIGHT  3,147,215
DEMINERALISATION OF WATER
Filed May 16, 1961  2 Sheets-Sheet 2
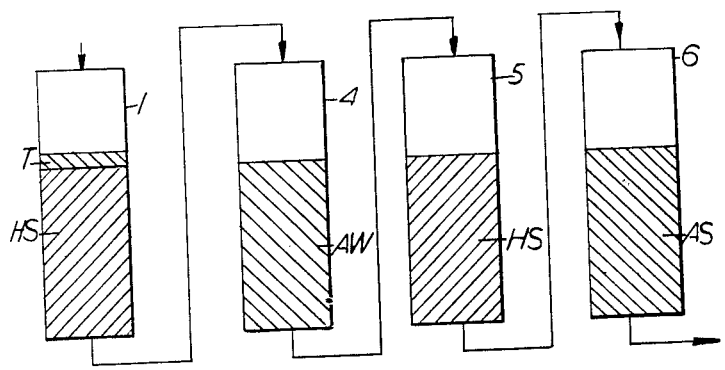
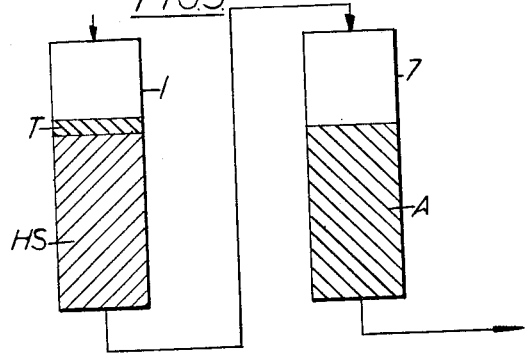
Inventor
FRANK CHARLES BLIGHT
By
Bailey, Stephens & Huettig
Attorneys United States Patent Office 3,147,215
Patented Sept. 1, 1964

3,147,215
DEMINERALISATION OF WATER
Frank Charles Blight, Sunbury-on-Thames, England, assignor to The Permutit Company Limited, London, England
Filed May 16, 1961, Ser. No. 110,467
Claims priority, application, Great Britain, May 20, 1960, 17,990/60
10 Claims. (Cl. 210—24)

In order to demineralise water, e.g. tap water, it is common practice to pass it either first through a granular bed of a cation-exchange material charged with hydrogen ions and then through a granular bed of an anion-exchange resin in the free base form, or through a bed consisting of a mixture of such materials, now well known as a mixed bed.

It is often desirable to reduce the mineral content of the water by a preliminary treatment, since reduction of the mineral content of the water to a very low level is best effected when the water fed to the pair of exchange beds or the mixed bed is already low. This preliminary treatment may comprise passing the water through a weakly acidic cation - exchange material charged with hydrogen ions so that the bicarbonate alkalinity is removed and the effluent is substantially neutral but contains dissolved carbon dioxide, and then removing this carbon dioxide by blowing air through the water. The preliminary treatment may also comprise passage of the water through a bed of cation-exchange material charged with sodium ions. This softens the water and enables the mixed bed to be better regenerated because sodium is more easily removed than calcium from the cation-exchange material of the mixed bed by the regenerating acid. Yet another preliminary treatment consists in passing the water through a pair of exchange beds (hydrogen-ion and anion) to effect considerable demineralisation, the anion-exchange resin in this preliminary pair usually containing weak-base groups.

In all these methods, whether there is preliminary treatment of the water or not, the water finally comes into contact with anion-exchange resin and may come into contact with it in the preliminary treatment.

Now if the water contains organic impurities a phenomenon known as fouling of the anion-exchange resin often occurs in the course of repeated cycles of treatment and regeneration, and in time the resin may become completely useless. This fouling is troublesome whether the anion-exchange resin contains strong-base groups or groups which are wholly or largely weakly basic. In most instances the anion-exchange resin with which the water finally comes into contact is the only one, and thus is the resin that is fouled, but if there is a preliminary pair of exchange beds the anion-exchange resin forming the second bed of this pair will be fouled and fairly quickly will allow the organic matter to pass through and foul the final anion-exchange resin also.

The fouling by organic matter present in the water is manifested by a decreased capacity of the resin for exchanging inorganic anions (i.e. for demineralising), a less complete exchange or uptake of those ions (i.e. a greater leakage of ions), and the need for a larger volume of rinse water after regeneration to remove the excess regenerant. Fouling seriously limits the useful life of the resin and necessitates its replacement while it is otherwise still in good condition. This is expensive. The fouling is thought to be due to the organic impurities becoming irreversibly absorbed on the resin and preventing or slowing down the rate of access of the ions in solution to the ion-exchange sites. The exact nature of the impurities that are thus absorbed from raw water is not known, but particularly severe fouling is found to occur in the demineralisation of surface waters.

In order to avoid such fouling of an anion-exchange resin a trap bed of an anion-exchange resin can be provided, i.e. the water is first passed through this bed and then through the bed of resin that would be fouled.

Now experience over many years has shown that any bed of ion-exchange resin must form a tall column, since the conditions of flow through a shallow bed are not satisfactory. A columnar bed at least 4 feet in depth is desirable. All the water to be treated must flow through the trap column and this must therefore be of the same diameter or of only a little smaller diameter than the mixed bed, since otherwise the rate of flow is too high. The removal of organic material by the trap column does not depend on the ionic form of the resin, which may in fact be in ionic equilibrium with the water. There is therefore no need to regenerate a trap column to restore its ion-exchange capacity, and it merely has to be treated (or regenerated) periodically to remove the organic matter. In view of its depth the column remains effective in removing organic matter for a considerable time in relation to that for which the mixed bed is effective in demineralising before it need be regenerated. For instance in a typical plant the mixed bed may be regenerated once a day, but the trap column only once a month, since naturally the operator will not pass a regenerant solution though the trap column more often than he need.

Experimental work has shown that a trap resin can be regenerated by a salt solution, i.e. the organic matter can be removed from it by such a solution. Experiments have also shown that a trap resin should be regenerated comparatively frequently, and that with regeneration at intervals of a month, or in fact at smaller intervals, organic matter becomes deeply embedded and is not removed on regeneration. The experiments further show that a trap resin operates best when the maximum amount of organic matter (expressed as oxygen absorbed from permanganate) it is allowed to take up before regeneration is about 0.2 lb. per cubic foot of resin.

Broadly in this invention water flowing to an anion-exchange resin is first passed through a column composed of cation-exchange material and a trap anion-exchange resin having strong-base groups in the salt form. The trap resin is most conveniently present as a separate layer, but will be effective if it is mixed with the cation-exchange material.

Because the trap resin is regenerated with salt it is in the salt form after regeneration. Therefore even if it is mixed with the cation-exchange material in the composite bed it does not behave in the same way as an anion-exchange material in a mixed bed, such a material being always used in the free-base form. When initially charged into the vessel that contains the column the trap resin may be in the free-base form, but there is no advantage in this. Immediately after each regeneration there may be some exchange of salt anions between the trap resin and the water, but throughout most of any run the trap resin and the water will be in ionic equilibrium, and the trap resin will not thereafter alter the composition of the water flowing in contact with it except for removing organic matter.

In the composite column the cation-exchange material may effect all or part of one of the preliminary treatments described above and may even be the first bed of a simple exchange pair used to effect the demineralisation. These various possibilities will be better understood by reference to the accompanying drawings, in which the various figures diagrammatically show different treatments of water.

In FIGURE 1 the raw water first flows through a vessel 1 containing a composite column composed of a trap layer T of an anion-exchange resin having strong-base groups and a bed S of cation-exchange material charged with sodium ions, and then through a vessel 2 containing a bed M of mixed cation-exchange and anion-exchange resins.

In FIGURE 2 the vessel 1 contains a trap layer T and a bed HW of weakly acidic cation-exchange material charged with hydrogen ions, and the water is then blown with air in a degasifier 3 before passing through a mixed bed M.

In FIGURE 3 the vessel 1 contains a trap layer T and a bed HS of strongly acidic cation-exchange material charged with hydrogen ions, and the water flows from it to a vessel 4 containing a bed AW of a weakly basic anion-exchange resin, and thereafter to a mixed bed M.

The treatment illustrated by FIGURE 4 is the same as that of FIGURE 3 except that the water from the vessel 4 flows to a pair of exchange beds instead of to a mixed bed, namely a bed HS in a vessel 5 and a bed AS of a strongly basic anion-exchange resin in a vessel 6.

FIGURE 5 shows a trap layer T in a composite column the remainder of which is formed by the cation-exchange bed HS of a single pair of exchange beds, the water flowing from the vessel 1 to a vessel 7 containing the second bed of this pair, which consists of an anion-exchange resin A that may have either strong-base or weak-base groups.

The cation-exchange material S, HW or HS is normally a resin but may be a carbonaceous material or (when used only in the sodium form, i.e. S) a zeolite.

It is of course necessary to backwash the composite column from time to time, and the trap resin and cation-exchange material will normally thereafter separate by stratification. It is well known that the anion-exchange resins commonly used are lighter than the corresponding cation-exchange resins, so that on stratification the anion-exchange resin always forms a top layer, and for this reason is shown as the top layer in the drawings. If, however, a lighter cation-exchange material is used with a heavier anion-exchange resin to form the composite column, the trap layer will of course be the lower. This is immaterial, since the cation-exchange material is not fouled by the organic matter.

The amount of trap resin used, i.e. the depth of a trap layer, may vary very considerably, provided it is enough to take up all the organic matter in the volume of water flowing through it between regenerations. In general a trap resin of volume less than ⅓ of the volume of the cation-exchange resin in the column is satisfactory.

The trap resin may be any usual microporous resin having strong-base groups including those which owe their ion-exchange properties to quaternary ammonium, guanidinium, tertiary sulphonium or tertiary phosphonium groups. Preferably, however, the trap resin is macroporous, i.e. a resin having large pores, with strong-base groups, which satisfies a test described below.

This test comprises subjecting the resins to repeated cycles of absorption and elution of tertiary butyl catechol sulphonic acid (TBCS). In carrying out this test 25 cc. of the wet resin in the form of a column is treated with 5% aqueous sodium hydroxide solution until it is fully in the hydroxide form. The excess alkali is washed away with distilled or demineralised water, which is then drained to the level of the top of the column. A solution containing 0.05 mole of TBCS per litre of water is then passed through the column of resin at 5 cc./min. until TBCS first appears in the effluent. This point of breakthrough can be determined by a rise in the electrical conductivity, care being taken to see that a rise in conductivity is, in fact, due to the sulphonic acid breaking through and not due to a trace of alkali. The rise in conductivity must be accompanied by an acid and not an alkaline reaction. As soon as such a rise in conductivity occurs, the volume of TBCS solution that has been used is measured, a volume of 10 cc. being subtracted to allow for the water originally filling the voids in the column.

The column is then regenerated with 5% aqueous sodium hydroxide solution in an amount equalvent to twice the stoichiometric quantity (i.e. equivalent to twice the total number of strong-base and weak-base ion-exchange groups present in the column), the excess again being washed off with water. The cycle of treatment with the standard TBCS solution followed by regeneration with two stoichiometric proportions of 5% aqueous sodium hydroxide solution is repeated, the volume of TBCS solution to breakthrough being recorded after each treatment.

A resin that has the ability to exchange ions for the ions of TBCS in successive cycles and arrives at a substantially constant capacity that is at least 15% of the initial strong-base capacity is defined as TBCS-satisfactory, and gives the best results when used as a trap resin in the present invention.

The anion-exchange groups in the trap resin, whether it is macroporous or microporous, must predominantly be and preferably are all strong-base groups, such as quaternary ammonium groups.

The regeneration of the trap resin can be effected either with a solution of a water-soluble salt, e.g. sodium chloride, which may be neutral or made slightly acid or alkaline, or with a solution containing both a water-soluble salt and a mild oxidising agent. Solutions containing sodium chloride and hypochlorite are particularly satisfactory. The amount of salt required to regenerate the trap resin is from 5 to 10 lbs. of NaCl per cubic foot of trap resin, and the salt is conveniently used as a 10% solution. Because common salt can be used, the composite column can be regenerated by a single regenerating solution when the cation-exchange material in it is used in the sodium form.

Two examples will now be given.

Example 1

Two vessels were used in series as shown in FIGURE 1 to treat tap water of the following composition:

|  | P.p.m. as $CaCO_3$ |
| --- | --- |
| Equivalent mineral acidity | 125. |
| Bicarbonate alkalinity | 210. |
| Total hardness | 274. |
| $SiO_2$ | 9 (as $SiO_2$). |
| Oxygen absorbed ($KMnO_4$; 4 hr. at 27° C.) | 1.2–2.0. |

The first vessel 1 was 9 inches in internal diameter and held the composite column, and the second vessel 2 was 12 inches in internal diameter and held the mixed bed. The composite column consisted of 1.75 cubic feet of a cross-linked polystyrene cation-exchange resin having sulphonic groups with exchangeable sodium ions and 0.25 cubic foot of a macroporous cross-linked polystyrene anion-exchange resin prepared as described in Example 3 of British patent specification No. 860,695 and in the chloride form. The mixed bed consisted of 1 cubic foot of the same cation-exchange resin and 2 cubic feet of a conventional strongly basic microporous cross-linked polystyrene anion-exchange resin. In a series of runs the composite bed was regenerated whenever hardness began to appear in the effluent and the mixed bed was regenerated when the conductivity began to rise rapidly. The composite column was backwashed after each regeneration and the anion-exchange resin, being less dense than the cation-exchange resin, formed a layer on top. No attempt was made to mix the two. Regeneration of the composite column was effected with 10.5 lb. NaCl as a 10% solution. This salt solution was passed through both resins and was taken to waste from the bottom of the column.

The primary purpose of employing any trap is to ensure constant performance of the mixed bed, as shown by its capacity in gallons of water between successive regenerations, the low electrical conductivity of the effluent water in micromhos and the number of bed volumes of rinsing water required after regeneration to bring the conductivity to 2 micromhos. The effect of using the comparatively small trap layer of macroporous resin is shown by the following figures obtained after various runs through the mixed bed as follows:

| Mixed bed Run No. | Capacity (gallons) | Conductivity (micromhos) | Rinse (bed vols.) |
|---|---|---|---|
| 1 | 610 | 0.2 | 3 |
| 96 | 605 | 0.2 | 3 |
| 233 | 615 | 0.2 | 3 |
| 417 | 610 | 0.2 | 3.5 |
| 602 | 600 | 0.3 | 3 |

By way of contrast the same mixed bed, when used without any preceding composite column, gave the following results:

| Mixed bed Run No. | Capacity (gallons) | Conductivity (micromhos) | Rinse (bed vols.) |
|---|---|---|---|
| 1 | 600 | 0.3 | 3 |
| 53 | 580 | 0.4 | 3.5 |
| 107 | 540 | 0.5 | 4.5 |
| 192 | 490 | 0.8 | 6 |

*Example 2*

The macroporous anion-exchange resin of Examples 1 was now removed from the composite bed and replaced by an equal quantity of a microporous strongly basic polystyrene anion-exchange resin. The performance of the mixed bed was as follows:

| Mixed bed Run No. | Capacity (gallons) | Conductivity (micromhos) | Rinse (bed vols.) |
|---|---|---|---|
| 1 | 600 | 0.3 | 3 |
| 89 | 570 | 0.4 | 3.5 |
| 158 | 560 | 0.4 | 4 |

These figures show the superiority of the macroporous resin as a trap layer.

When the trap resin in the composite column is regenerated with salt and the cation-exchange material in it is regenerated with acid, the regeneration can be effected in various ways. In every case it is assumed that the trap resin is present as a layer.

In one such way of regenerating the composite column, salt solution is first passed through the composite column, with the result that some of the calcium and magnesium ions on the cation-exchange material are exchanged for sodium ions, but this material does not become exhausted to any greater extent. Then acid is passed through the column. If this is hydrochloric acid it will not affect the trap resin, and if it is sulphuric acid it will merely convert that resin from the chloride to the sulphate form. In either case it will convert the cation-exchange material to the hydrogen form.

In another such way of regenerating a composite column that includes a trap layer, salt solution is brought into and left in contact with the trap layer only and then removed, and thereafter acid is passed through the whole column. Thus with a trap layer above the bed of cation-exchange material enough salt is introduced at the top to displace the water in contact with the trap layer, and is then left in contact with the trap layer for a period of time, say 30 minutes. Then the composite column is back-washed with water, the resins are allowed to settle, and the acid is passed through the column. In this method the regeneration of the trap layer is wholly effected by a volume of regenerant equal to that of the layer, and the regenerant must be of appropriate concentration, i.e. usually of greater concentration than when a salt solution is passed through the trap layer.

In a third such way of regenerating a composite column that includes a trap layer the salt solution is passed through the trap layer only and acid through the cation-exchange material only. To enable this to be done a liquid-distributor may be arranged at the interface of the two resins. Assuming the trap layer to be at the top of the column it is then regenerated with salt which enters at the top and leaves through the distributor to waste. The cation-exchange material is subsequently regenerated by acid introduced either at the top or through the distributor and leaving at the bottom of the column.

By means of the invention the number of vessels required is reduced by one; the amount of anion-exchange resin required as the trap for the organic matter is considerably reduced; and in the regeneration of sodium-exchange material in the column a single regenerating solution can be used.

I claim:

1. A process for demineralising water comprising passing the water first through a tall column composed of a cation-exchange material and a trap anion-exchange resin having strong-base groups in the salt form, the cation-exchange resin being present in substantially greater quantity than the anion-exchange resin and thereafter in contact with an anion-exchange resin.

2. A process according to claim 1 in which the cation-exchange material in the composite column is in the sodium form.

3. A process according to claim 2 in which the materials forming the composite column are periodically regenerated by the passage of sodium chloride solution through both.

4. A process according to claim 1 in which the cation-exchange material in the composite column is a resin in the hydrogen form, and periodically the trap resin is regenerated by a salt solution and the cation-exchange resin by acid.

5. A process according to claim 4 in which the salt solution is first passed through the column and then the acid is passed through the column.

6. A process according to claim 4 in which the trap resin is present as a layer, the salt solution is brought into and left in contact with the trap layer only and then removed, and thereafter acid is passed through the whole column.

7. A process according to claim 4 in which the trap resin is present as a layer, the salt solution is passed through the trap layer only and the acid through the cation-exchange material only.

8. A process according to claim 1 in which substantially all the exchange groups in the trap resin are strongly basic.

9. A process according to claim 1 in which the volume of the trap resin in the composite column is less than ⅕th of that of the cation-exchange material.

10. A process for demineralising water comprising first passing the water through a tall column composed of a cation-exchange material in the sodium form and a layer of a trap anion-exchange resin having strong-base groups in the salt form, the cation-exchange resin being present in substantially greater quantity than the anion-exchange resin and thereafter through a mixed bed of cation-exchange and anion-exchange resins, and periodically regenerating the composite bed with sodium chloride.

References Cited in the file of this patent

UNITED STATES PATENTS

| | | |
|---|---|---|
| 2,597,493 | Hwa | May 20, 1952 |
| 2,785,998 | Harding et al. | Mar. 19, 1957 |

FOREIGN PATENTS

| | | |
|---|---|---|
| 860,695 | Great Britain | Feb. 8, 1961 |

OTHER REFERENCES

Frisch et al.: Ind. & Eng. Chem., vol. 49, No. 9, September 1957, pages 1365–1372.